United States Patent
Phadnis et al.

(10) Patent No.: US 7,107,360 B1
(45) Date of Patent: Sep. 12, 2006

(54) NETWORK ADDRESS TRANSLATION IN A GATEWAY

(75) Inventors: Amit S. Phadnis, Karnataka (IN); Praneet Bachheti, San Jose, CA (US); Anuradha Karuppiah, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 796 days.

(21) Appl. No.: 09/910,937

(22) Filed: Jul. 24, 2001

(51) Int. Cl.
G06F 15/173 (2006.01)
G06F 15/16 (2006.01)
G06F 9/26 (2006.01)

(52) U.S. Cl. .................. 709/250; 709/239; 709/240; 709/242; 709/244; 711/200

(58) Field of Classification Search ............... 709/250, 709/238–244
See application file for complete search history.

(56) References Cited

U.S. PATENT DOCUMENTS

| | | | |
|---|---|---|---|
| 6,331,984 B1 | 12/2001 | Luciani | 370/401 |
| 6,563,824 B1* | 5/2003 | Bhatia et al. | 370/392 |
| 6,608,830 B1* | 8/2003 | Hirano et al. | 370/351 |
| 6,678,269 B1 | 1/2004 | Michels et al. | 370/389 |
| 6,691,169 B1* | 2/2004 | D'Souza | 709/242 |
| 6,704,317 B1* | 3/2004 | Dobson | 370/401 |
| 2001/0039593 A1* | 11/2001 | Hariu | 709/249 |
| 2002/0114319 A1 | 8/2002 | Liu | 370/352 |

OTHER PUBLICATIONS

Network Working Group Request for Comments 1213, Mar. 1991, Management Information Base for Network Management of TCP/IP-based Internets: MIB-II.*
www.webopedia.com=>NAT.*
P. Srisuresh & M. Holdrege; Entitled, "Request for Comments: 2663- IP Network Address Translator (NAT) Terminology and Considerations"; Available from www.ietf.org; Aug. 1999; (30 Pages).

* cited by examiner

*Primary Examiner*—Kim Huynh
*Assistant Examiner*—Alan S. Chen
(74) *Attorney, Agent, or Firm*—Narendra Reddy Thappeta (57) ABSTRACT

A gateway using multiple NAT tables to translate network addresses (e.g., Internet Protocol Addresses). The gateway may comprise a service selection gateway connecting remote systems to service domains. The gateway translates local addresses of remote systems to external addresses, and vice versa. The external addresses (bound to the respective local addresses) may be provided by the service domains. The NAT information is partitioned according to service domains such that the external addresses related to the same service domain are stored in the same NAT table. If there is no overlap of external addresses provided by two service domains, the two service domains may share the same NAT table. Due to the partitioning of the NAT information, each table may be limited to be of small size, and the accesses to individual tables may be fast. As a result, a gateway may be able to process and forward packets quickly.

40 Claims, 5 Drawing Sheets

NETWORK ADDRESS TRANSLATION IN A GATEWAY

BACKGROUND OF THE INVENTION

1. Field of the Invention

The present invention relates to gateways used in Internetworking Technologies, and more specifically to a method and apparatus for performing network address translation (NAT) in a gateway.

2. Related Art

Gateways are often used to enable users at remote locations (e.g., at homes) to access different target systems (e.g., a computer system on a local area network). A gateway provides the connectivity between remote systems (e.g., personal computers) at remote locations with the target systems of interest to enable different network applications.

A service selection gateway (SSG) is a type of gateway which facilitates a remote user to use various services provided using the Internetworking technologies. Examples of such services include access to the world-wide-web and a virtual private network (VPN) to a specific target location (e.g., to an employer site). SSGs are often integrated with routers into a single unit as is well known in the relevant arts.

Network address translation (NAT) is often performed within an SSG (or gateway in general). NAT commonly refers to replacing one network layer address in a packet with a second network layer address. In a typical application of NAT in an SSG, a packet is received from a remote location in the upstream direction. The source address field of the packet contains a local address of a system ("remote system") at a remote location The local address is substituted with an address ("external address") in the SSG, and the mapping of the local address to the external address may be referred to as a NAT operation.

The external address is usually provided from a service domain (e.g., other end of a VPN) and is unique within the service domain. The packet with the substituted external address is sent to the service domain. A reverse translation is performed from the external address to the local address when packets are received from the service domain. Thus, even if the addresses in the remote location overlap with the addresses in the service domain, remote locations can access the services.

A NAT table is often maintained to map each of the local address to a corresponding external address and vice versa. In a prior system, an SSG may maintain a single global NAT table for all the translations. One problem with such an approach is that a big table may be required to support a large number of services and the related users. The table size may lead to long lookup times and impede the throughput performance of a gateway.

Accordingly, what is required is an efficient method and apparatus to implement NAT operations within a SSG.

SUMMARY OF THE INVENTION

A gateway device in accordance with the present invention supports network address translation (NAT) by using multiple NAT tables. By partitioning the NAT information into multiple tables, each table may be maintained to be small enough to access individual required entries quickly. As a result, the throughput performance of gateway devices may not be impeded substantially by large NAT tables.

The NAT tables may be stored in a memory implemented as one or more units. An inbound interface receives a packet containing an original address. A NAT block translates the address into a new address using one of the NAT tables and substitutes the new address for the original address in the packet to generate a new packet. An outbound interface sends the new packet containing the new address.

In one embodiment, the gateway device comprises a service selection gateway (SSG) connecting multiple remote systems to multiple service domains. When a packet is received from a remote system destined to a corresponding service domain, the local address (in the source field) may need to be replaced by a new address ("external address") earlier specified by the service domain. A NAT block performs such a replacement by accessing a NAT table provided in accordance with an aspect of the present invention.

The NAT table may contain the mapping (binding) information related to all addresses provided by a service domain. As many users typically access the same service domain, a single NAT table may be shared by all such users of the same service. According to one more aspect of the present invention, if multiple domains shared by the users have non-overlapping accessible address space, a single NAT table may be used to manage the mapping information for all such service domains. Thus, multiple tables may be maintained partitioned according to the service domains.

The gateway may also contain a service selection table which stores data indicating a mapping of each packet (e.g., based on the source IP address in the case of PPP sessions) to a corresponding service domain. A service selector determines a service domain to which the packet relates to by examining the service selection table, and forward the packet for processing according to the corresponding NAT table.

According to one more aspect of the present invention, separate forwarding table may also be maintained for each service domain (or according to the partitioning of the NAT tables in case of no overlap of the external addresses, as noted above) to process packets in the upstream direction. By maintaining separate forwarding tables and NAT tables, the service domains not sharing the same NAT table (and forwarding table) may contain overlapping external addresses.

With respect to downstream processing of packets received from service domains to remote systems, each external address in the destination field needs to be replaced by the corresponding local address. Another NAT block may translate the external address to the local address of the remote system by examining the NAT table provided in accordance with the present invention. Alternatively, the same NAT block can be used in both the upstream and downstream directions. The NAT block replaces the external address with the local address. A global forwarding table may then be used to route the packet with the replaced address.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention is described with reference to the accompanying drawings, wherein.

DETAILED DESCRIPTION OF THE PREFERRED EMBODIMENTS

1. Overview and Discussion of the Invention

The present invention allows efficient implementation of network address translation (NAT) by using different tables for different services. Potentially, a single table may be used for each service, with the result that the individual table sizes are reduced (compared to a single global NAT table approach of the prior art). As each individual table is small, the individual mapping entries may be quickly retrieved, and any negative impact on throughput performance of a gateway may be reduced due to the use of multiple NAT tables.

The invention is described below with reference to an example environment for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention. Furthermore the invention can be implemented in several other environments.

2. Example Environment

Figure 1:
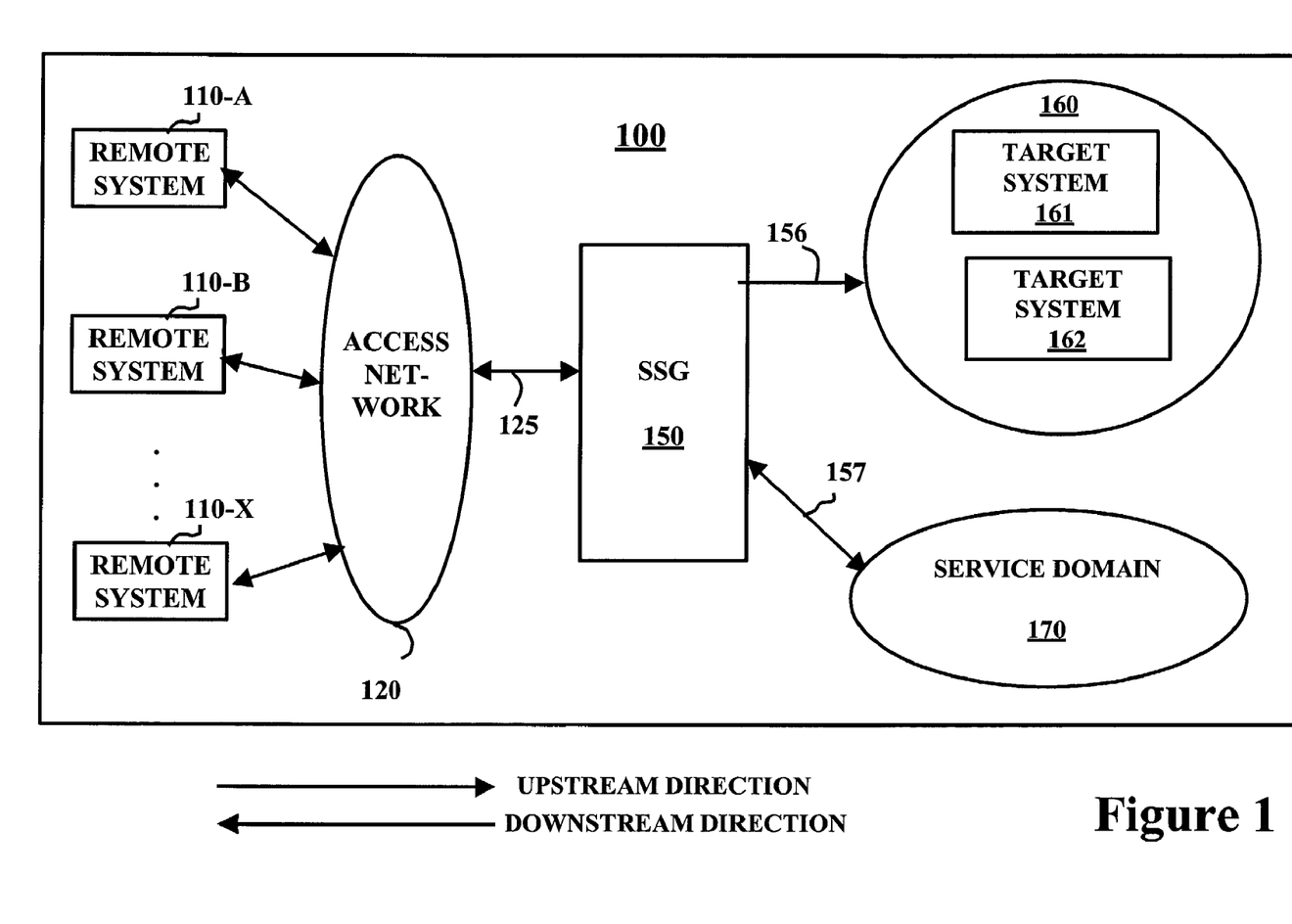
FIG. 1 is a block diagram illustrating an example communication environment in which the present invention can be implemented.

FIG. 1 is a block diagram of an example communication environment 100 in which the present invention can be implemented. Communication environment 100 may contain remote systems 110-A through 110-X, access network 120, SSG (service selection gateway) 150, and service domains 160 and 170. An embodiment of communication environment 100 is implemented using Internet Protocol (IP), and further description is continued substantially with reference to IP. However, various aspects of the present invention can be implemented using other protocols also.

Each of the remote systems 110-A through 110-X is addressed by a local address, unique at least when SSG 150 assigns the local addresses during the setup of the corresponding PPP (point-to-point protocol) sessions. Only the details of PPP as relevant to an understanding of the example environment are described herein. For further details about PPP, the reader is referred to request for comment (RFC) 1661, available from www.ietforg, and is incorporated in its entirety herewith. Computer systems (or any data processing systems) are examples of the remote systems.

Remote systems 110-A through 110-X may be used to access the services provided using target systems (e.g., 161 and 162 within service domain 160) in various service domains 160 and 170 as described below in further detail. Access network 120 provides the electrical and physical interface consistent with the technology (e.g., remote access, Digital Subscriber Line) used by the corresponding remote system. Access network 120 may be implemented in a known way.

Service domain 160 may correspond to a corporate network, which can be accessed by users at remote systems 110-A through 110-X using VPN service. Service domain 170 may correspond to an Internet Service Provider (ISP). Each service domain typically contains many target systems, even though only two target systems are shown in service domain 160 for illustration.

An embodiment of SSG 150 enables each remote system to set up a PPP session and access different services as described in detail below. SSG 150 performs forwarding and NAT operations to enable such access. Accordingly, NAT and forwarding operations in an example situation are described for illustration.

3. Illustrative Example

For illustration, it is assumed that a user wishes to access service domain 160 using remote system 110-A (having a local IP address of addr-A). Using a known approach, service domain 160 may assign an external IP address of addr-T to remote system 110 for accessing service domain 160. Addr-T represents a unique address at least in service domain 160. Similarly, using another known approach (e.g., during PPP session set up or even manually by a network administrator), remote system 110 is assigned (by SSG 150) a local address of addr-A.

SSG 150 maintains information indicating that the source address addr-A needs to be translated into addr-T in the upstream direction (i.e., from remote systems to service domains), and the destination address addr-T is to be translated to addr-A in the downstream direction (from service domains to remote systems). The translated new address (external address in the upstream direction and local address in the downstream direction) replaces the original address (local address in upstream direction and external address in the downstream direction) in a packet, and the packet with the translated address is transmitted by SSG 150.

The manner in which SSG 150 manages the information necessary for the translations is described below. The approach is particularly suited when many systems (e.g., several thousands) access many services. The approach is described first with reference to a method and then with reference to an example implementation.

4. Method

Figure 2:
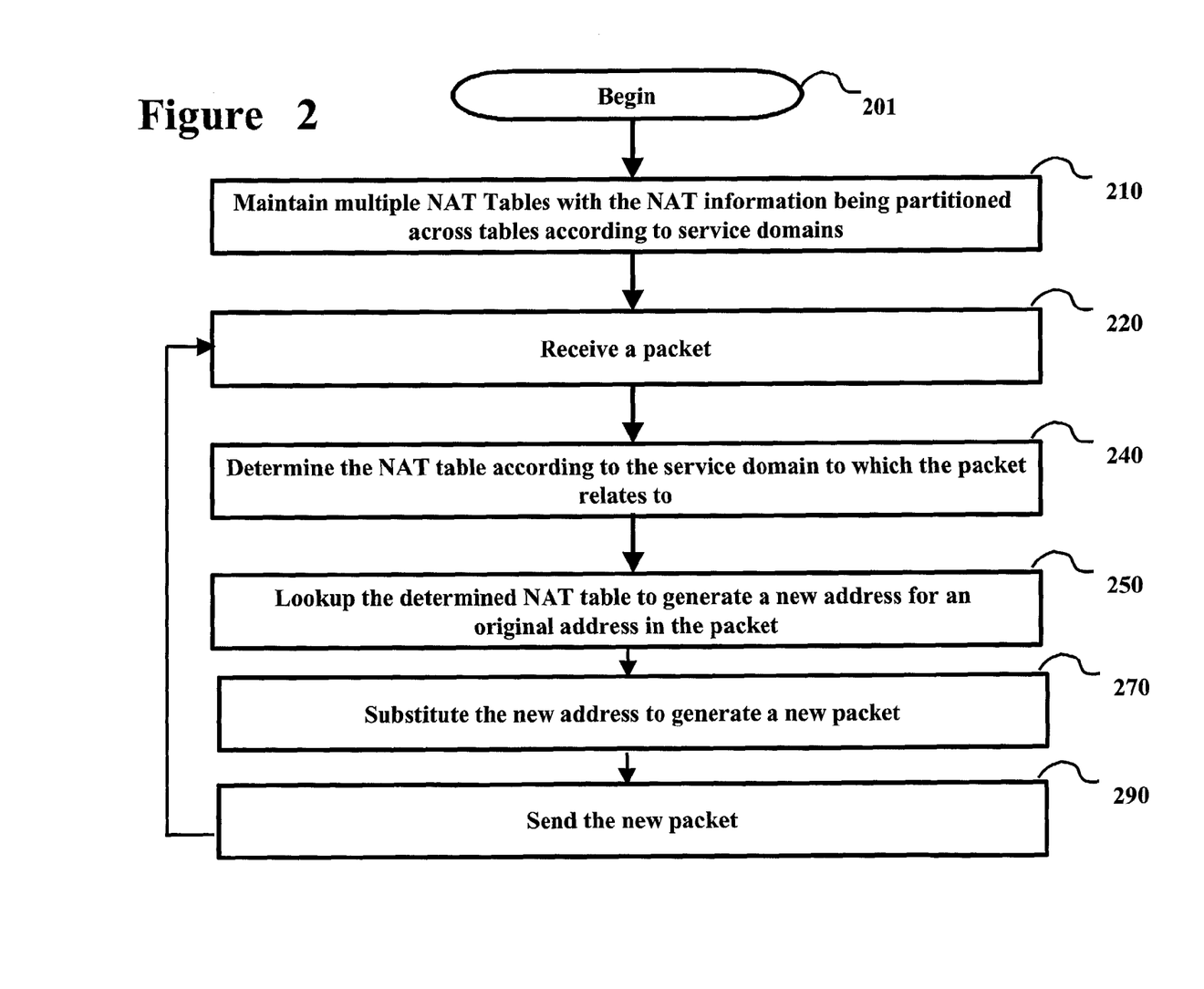
FIG. 2 is a flow chart illustrating a method in accordance with the present invention.

FIG. 2 is a flow chart depicting a method in accordance with the present invention. The method is described with reference to FIG. 1 for illustration. However, the method may be performed in other environments as well. The method starts in step 201, in which control immediately passes to step 210.

In step 210, SSG 150 maintains multiple NAT tables with the mapping information partitioned according to service domains such that NAT information related to external addresses related to the same domain are stored in the same NAT table. In an embodiment described below, a NAT table is maintained for each service domain. In another embodiment, a table contains information related to multiple service domains if the accessible address space of the service domains are non-overlapping (i.e., without even a single common address). The remaining steps process a packet according to the information in the NAT tables as described below.

In step 220, SSG 150 receives a packet. For illustration, the processing of the packet is described in the upstream direction and with reference to the example described in the section above (in which source address addr-A is translated to addr-T). However, the concepts may be applied in the downstream direction as well. Thus, the packet is received from remote system 110-A in the present illustrative example.

In step 240, SSG 150 may determine the service domain to which packet relates to. In an embodiment described below, the set of services accessible by each user is determined and stored in SSG 150 when a user establishes a PPP session. At the session set up time, SSG 150 assigns a local IP address (addr-A). Based on the local IP address of a received packet, SSG 150 determines the set of services the user (packet) is entitled to receive. The destination address is then used to determine the specific one of the services. The corresponding one of the NAT tables is selected based on the determined service domain in accordance with the partitioning of step 210.

In step 250, the selected NAT table is used to translate the source IP address (addr-A) into the corresponding external address, addr-T (which might have been provided earlier by service domain 160 and stored in the corresponding NAT table).

In step 270, the translated external address is substituted for the source IP address. Any other fields (e.g., checksums) which depend on the value of the source IP address field may be re-computed. In step 280, the new packet with the substituted data is sent to the service domain.

The packets received in the downstream direction may also be processed similarly using multiple NAT tables. That is, the destination IP address (external address) is replaced by the corresponding local address using the NAT tables provided in accordance with the present invention. Due to the partitioning of the NAT information into multiple NAT tables, the NAT look-ups may be quick in upstream and/or downstream directions, and SSG 150 may be able to forward packets quickly. The description is continued with an embodiment of SSG 150.

5. Upstream Packet Processing in Service Selection Gateway

Figure 3:
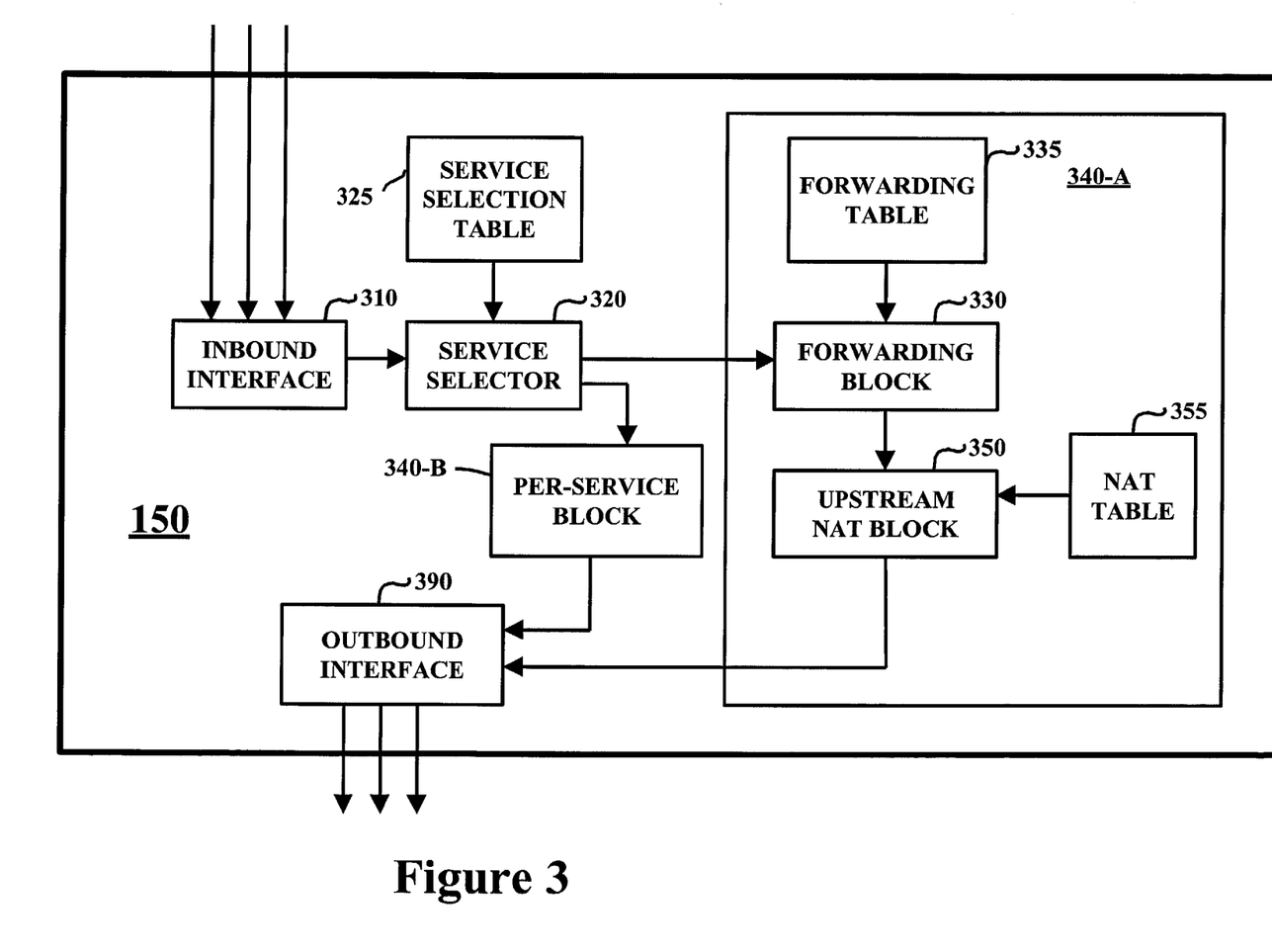
FIG. 3 is a block diagram illustrating the internals of a service selection gateway (SSG) as relevant to upstream forwarding of packets in an embodiment of the present invention.

FIG. 3 is a block diagram illustrating the details of an embodiment of SSG 150 as relevant to upstream processing of packets. SSG 150 is shown containing inbound interface 310, service selector 320, per-service blocks 340-A and 340-B, and outbound interface 390. Each component is described below in further detail.

Per-service block 340-A is shown containing forwarding block 330, forwarding table 335, and upstream NAT block 350. Per-service block 340-B may also contain similar components (including another NAT table), but are not shown (and described) for conciseness. Accordingly, the description of per-service blocks is continued with reference to only per-service block 340-A.

In one embodiment the forwarding and NAT blocks in the per-service blocks 340-A and 340-B are implemented substantially in software (i.e., in the form of instructions organized as routines). In such a case, the forwarding and NAT blocks may be shared by different per-service blocks 340-A and 340-B. Alternatively, each of the blocks may be implemented in the form of integrated circuits, usually to attain higher throughput performance in the service selection gateways.

In general, when throughput performance is of primary consideration, the implementation is performed more in hardware (e.g., in the form of an application specific integrated circuit). When cost is of primary consideration, the implementation is performed more in software (e.g., using a processor executing instructions provided in software/firmware). Cost and performance can be balanced by implementing device 130 with a desired mix of hardware, software and/or firmware. The description is continued with reference to each noted component of FIG. 3 above.

Inbound interface 310 is shown receiving packets from three paths (125, 156 and 157 of FIG. 1). Inbound interface 310 assembles each packet and forwards the packets to service selector block 320. Inbound interface 310 provides the electrical and other protocol interfaces necessary to receive packets from various paths, and may be implemented in a known way. Outbound interface 390 is also described similarly, except that the packets received from per-service blocks 340-A and 340-B are transmitted in the outbound direction on the same three ports.

Each received packet contains a source address and a destination address. By using NAT approach in accordance with various aspect of the present invention, one of the two addresses (original address) is replaced with a new address as described below in further detail.

Service selector 320 determines the specific NAT table to use for each packet by accessing service selection table 325. In an embodiment operating in the context of PPP protocol, a local address is assigned to each remote system when a user establishes a PPP session. Service selection table 325 is configured with (or otherwise has access to information indicating) the specific service domains the user is entitled to access. The access information may be maintained on an authentication server (not shown in Figures) and be made available to SSG 150 when the PPP session is set up.

Thus, when a packet is received, the source IP address is examined to determine the specific services the user is entitled to access. The destination address in the packet is then used to determine the specific one of the service domains to which the packet is to be forwarded to (assuming a constraint that a user system can access only domains with non-overlapping IP destination addresses at the same time).

Service selector 320 then selects one of the per-service blocks 340-A or 340-B (or more specifically the corresponding NAT table) depending on the determined service domain. Assuming the determined service domain is service domain 160 and per-service block 340-A is designed to process the packets related to service domain 340-A, service selector 320 passes a received packet to per-service block 340-A.

Forwarding block 330 determines an interface on which a received packet is to be forwarded. The determination is performed based on the route entries present in forwarding table 335. The route entries may also be partitioned according to service domains, similar to the NAT information, and thus forwarding table 335 contains information related to service domain 160 only.

NAT table 355 stores the mapping information of the original addresses to new addresses in service domain 160. Even though the present description is provided with reference to NAT table 355 storing the information related to only one service domain, an aspect of the present invention enables information related to multiple service domains to be stored in NAT table 355 if the external addresses provided by the service domains do not overlap. NAT table 355 may be implemented using random access memories widely available in the industry.

Upstream NAT block 350 receives a packet and performs a NAT operation on the source address of the packet. That is, the source address is sent to NAT table 355 to receive a new address (sent earlier by service domain 160). Upstream NAT block 350 then replaces the source address with the new address and re-computes any fields in the packet as required due to the replacement.

Any of the fields (e.g., checksum or CRC) which need be re-computed, may be re-computed and set in the packet. The packet is then forwarded to outbound interface 390, which sends the packet on the interface determined by forwarding block 330. As noted above, upstream NAT block 350 may be implemented in the form of software routines and/or electrical circuits.

Thus, the embodiment described above processes packets in an upstream direction. The processing of the packets in downstream direction is described below with reference to FIG. 4.

5. Downstream Processing of Packets in Service Selection Gateway

Figure 4:
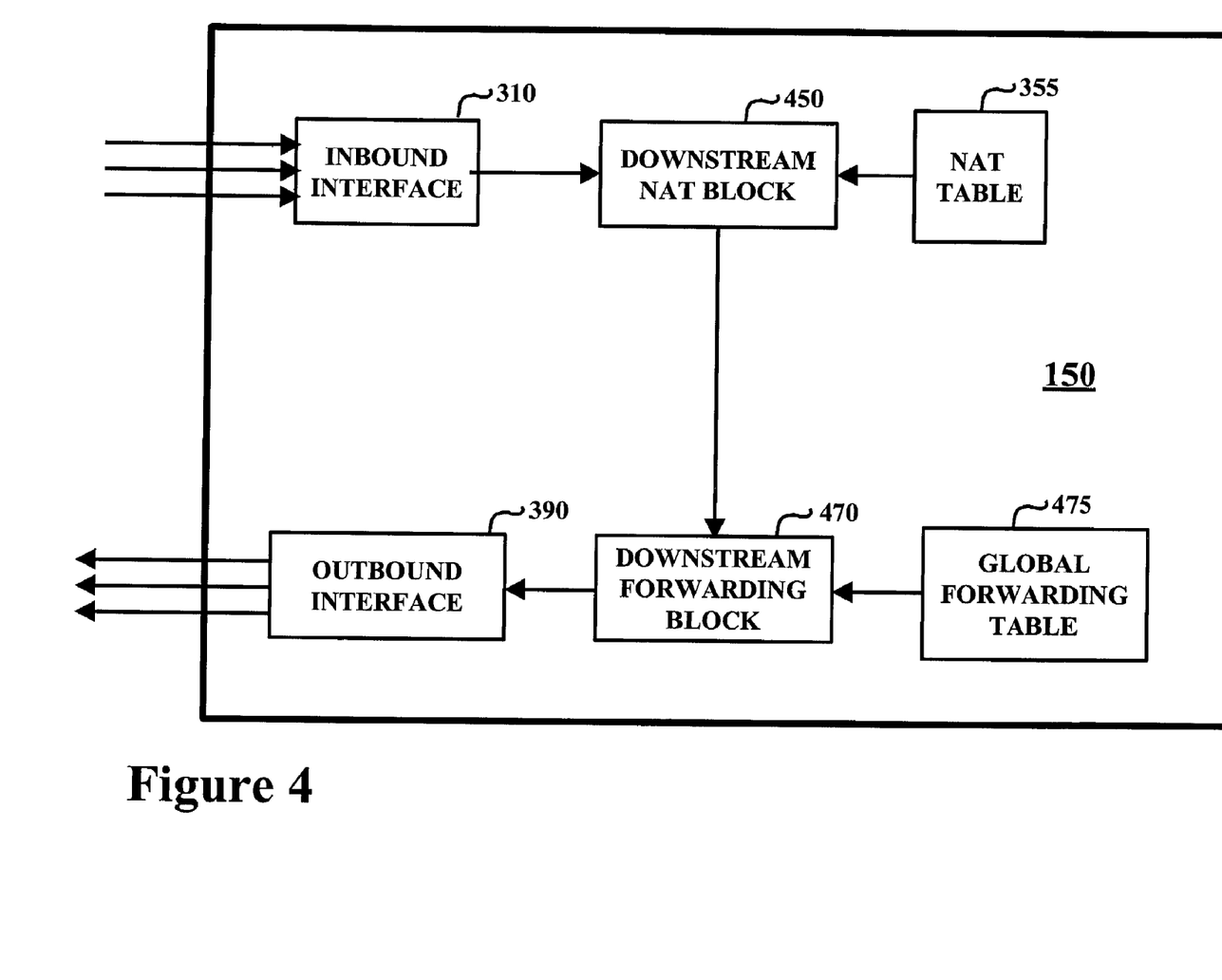
FIG. 4 is a block diagram illustrating the internals of an embodiment of SSG as relevant to downstream forwarding of packet.

FIG. 4 is a block diagram illustrating the details of operation of an embodiment of SSG 150 as relevant to the processing of packets in downstream direction. In relation to FIG. 3, similar elements are shown with similar labels and reference numerals, and the description is not repeated here for conciseness. SSG 150 is shown containing inbound interface 310, downstream NAT block 450, NAT table 355, downstream forwarding block 470, and outbound interface 390.

Downstream NAT block 450 receives packets from inbound interface 310, and performs a NAT operation on the external address contained in the destination field of each packet. The external address is mapped to the local address of the corresponding remote system, and the external address is replaced by the local address. Downstream NAT block 450 re-computes any fields of the packet as necessitated by the replacement, and the packet with the destination address and the re-computed values is passed to downstream forwarding block 470.

A single downstream NAT block may be implemented for each service domain (or service domains which do not have overlapping accessible address space) as in the case of upstream NAT block 350. In one embodiment, the interface on which a packet is received indicates the service domain (s) from which the packets are received, and the packet is accordingly passed to the corresponding downstream NAT block. In alternative embodiments, a single block may be shared by all the service domains. Even in such a scenario, multiple NAT tables partitioned according to service domains, are examined by the NAT block. Shared NAT blocks can be employed when implemented substantially in the form of software routines.

Downstream forwarding block 470 receives a packet from downstream NAT block 450, and determines the specific interface on which transmit the packet. The determination is based on examining global forwarding table 475. As the destination addresses are translated back to the original addresses of the remote systems, the destination addresses in the packets may be unique, and thus a global forwarding table may be shared by all downstream forwarding blocks.

Downstream forwarding block 470 forwards to outbound interface 390 a packet along with data representing the specific interface on which the packet needs to be transmitted. Outbound interface 390 transmits the packet accordingly. In the illustration at hand, the packet is transmitted on path 125 destined to remote system 110-A. Thus, the embodiment(s) of FIGS. 3 and 4 enable service selection gateways to perform NAT operations efficiently by partitioning the NAT information into multiple tables according to the service domains to which the packets relate to.

Each component of SSG 150 described above may be implemented substantially in hardware. However, any of the components may be implemented in a combination of one or more of hardware, software and firmware. An embodiment implemented substantially in software is described below.

6. Software Implementation

Figure 5:
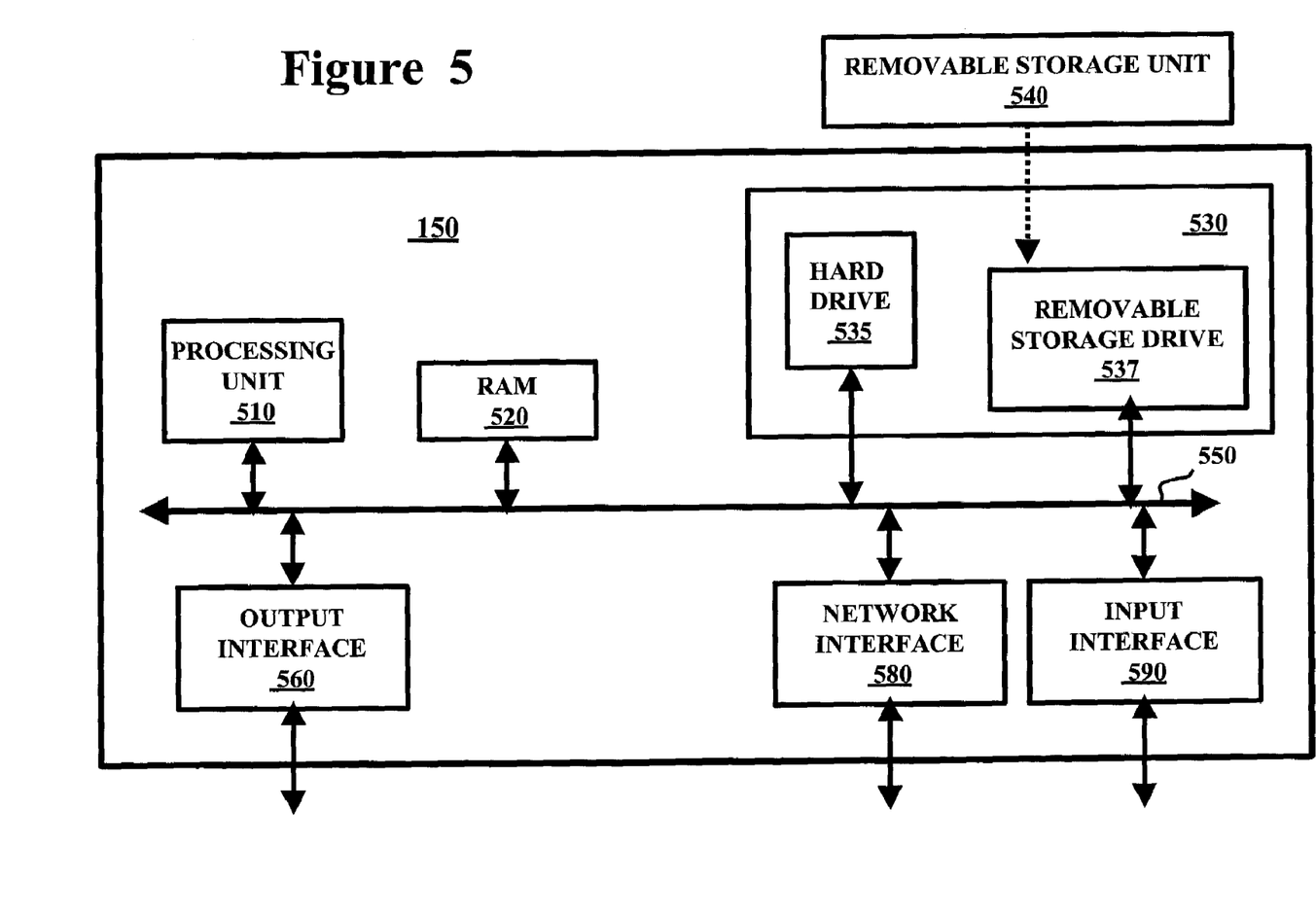
FIG. 5 is a block diagram illustrating the implementation of a substantially in software according to an aspect of the present invention.

FIG. 5 is a block diagram illustrating the details of a network device (e.g., SSG 150) in one embodiment. SSG 150 is shown containing processing unit 510, random access memory (RAM) 520, storage 530, output interface 560, network interface 580 and input interface 590. Each component is described in further detail below.

Output interface 560 provides output signals (e.g., display signals to a display unit not shown) which can form the basis for a suitable user interface for a user to interact with SSG 150. Input interface 590 (e.g., interface with a key-board and/or mouse, not shown) enables a user to provide any necessary inputs to SSG 150. Output interface 560 and input interface 590 can be used, for example, to enable configuration of SSG 150 to provide various features of the present invention.

Network interface 580 enables SSG 150 to send and receive data on communication networks using protocols such as Internet Protocol (IP). Network interface 580 may correspond to inbound interface 310 and outbound interface 390 of FIG. 3. Network interface 580, output interface 560 and input interface 590 can be implemented in a known way.

RAM 520 and/or storage 530 may be referred to as a memory. RAM 520 may receive instructions and data on path 550 from storage 530. Even though shown as one unit, RAM 520 may be implemented as several units, and the NAT tables may be stored in the units. Secondary memory 530 may contain units such as hard drive 535 and removable storage drive 537. Secondary storage 530 may store the software instructions and data, which enable SSG 550 to provide several features in accordance with the present invention.

Some or all of the data and instructions (software routines) may be provided on removable storage unit 540, and the data and instructions may be read and provided by removable storage drive 537 to processing unit 510. Floppy drive, magnetic tape drive, CD-ROM drive, DVD Drive, Flash memory, removable memory chip (PCMCIA Card, EPROM) are examples of such removable storage drive 537.

Processing unit 510 may contain one or more processors. Some of the processors can be general purpose processors which execute instructions provided from RAM 520. Some can be special purpose processors adapted for specific tasks (e.g., for memory/queue management). The special purpose processors may also be provided instructions from RAM 520. In general, processing unit 510 reads sequences of instructions from various types of memory medium (including RAM 520, storage 530 and removable storage unit 540), and executes the instructions to provide various features of the present invention described above.

Thus, SSG 150 may be implemented substantially in software to process various packets received from remote systems and service domains. Gateways may be implemented in service domains 160 and 170 similar to SSG 150 to use multiple NAT tables as will be apparent to one skilled in the relevant arts by reading the disclosure provided herein. Such other implementations are also contemplated to be within the scope and spirit of the present invention.

6. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of supporting network address translation (NAT) in a service selection gateway (SSG), said SSG connecting a plurality of remote systems on a network to a plurality of service domains, each of said plurality of remote systems being assigned a corresponding one of a plurality of original addresses, wherein each of a plurality of new addresses is used for a corresponding one of said plurality of remote systems in a corresponding service domain, each of said plurality of original addresses comprising a local address in said network and each of said plurality of new addresses comprising an external address for the remote system in the service domain, said method being performed in said SSG, said method comprising:

maintaining a plurality of NAT tables, wherein each of said plurality of NAT tables maintains a corresponding plurality of entries representing a mapping information of original addresses to corresponding new addresses, wherein said plurality of entries are partitioned according to service domains such that entries corresponding to each service domain are stored in a single one of said plurality of NAT tables, wherein an entry corresponds to a service domain if the corresponding new address is in the service domain;

receiving a packet containing a first address;

translating said first address into a second address by examining one of said plurality of NAT tables, wherein said first address corresponds to one of said plurality of original addresses or one of said plurality of new addresses of a first remote system, and wherein said second address comprises the other one of said plurality of original addresses or one of said plurality of new addresses of said first remote system;

substituting said second address for said first address in said packet to generate a new packet, and sending said new packet to one of said plurality of remote systems or one of said service domains determined by a destination address in said new packet.

2. The method of claim 1, wherein each of said plurality of NAT tables stores NAT information corresponding to one of said plurality of service domains only.

3. The method of claim 1, wherein at least one of said plurality of NAT tables stores all mapping information related to at least two of said plurality of service domains, wherein external addresses provided for mapping by said at least two of said plurality of service domains do not overlap.

4. The method of claim 1, wherein said translating comprises mapping said local address of said first remote system to said external address of said first remote system, wherein said external address is assigned to said first remote system by said service domain accessed by said first remote system.

5. The method of claim 4, further comprising:

determining a service domain to which said packet relates to, wherein said service domain is comprised in said plurality of service domains; and sending said packet to an upstream NAT block which performs said substitution.

6. The method of claim 5, wherein said first remote system communicates with said SSG on a point-to-point protocol (PPP) session, said method further comprising:

assigning said local address to said first remote system when said PPP session is set up;

storing in said SSG data representing a set of services available for packets received from said first remote system, wherein said determining comprises examining a destination address in said packet to identify said service domain to which said packet relates to.

7. The method of claim 6, wherein a separate upstream NAT block associated with each of said plurality of NAT tables.

8. The method of claim 7, further comprising maintaining a separate forwarding table associated with the service domains sharing the same NAT table.

9. The method of claim 1, wherein said packet is received from said service domain and destined to said first remote system, and wherein said first address comprises said external address of said first remote system.

10. The method of claim 9, further comprising:

maintaining a global forwarding table; and determining a route to send said packet by examining said global forwarding table, wherein said determining is performed after said substituting.

11. The method of claim 1, wherein said packet is received according to Internet Protocol (IP).

12. A service selection gateway (SSG) supporting network address translation (NAT), said SSG connecting a plurality of remote systems on a network to a plurality of service domains, each of said plurality of remote systems being assigned a corresponding one of a plurality of original addresses, wherein each of a plurality of new addresses is used for a corresponding one of said plurality of remote systems in a corresponding service domain, each of said plurality of original addresses comprising a local address in said network and each of said plurality of new addresses comprising an external address for the remote system in the service domain, said SSG comprising:

means for maintaining a plurality of NAT tables, wherein each of said plurality of NAT tables maintains a corresponding plurality of entries representing a mapping information of original addresses to corresponding new addresses, wherein said plurality of entries are partitioned according to service domains such that entries corresponding to each service domain are stored in a single one of said plurality of NAT tables, wherein an entry corresponds to a service domain if the corresponding new address is in the service domain;

means for receiving a packet containing a first address;

means for translating said first address into a second address using one of said plurality of NAT tables, wherein said first address corresponds to one of said plurality of original addresses or one of said plurality of new addresses of a first remote system, and wherein said second address comprises the other one of said plurality of original addresses or one of said plurality of new addresses of said first remote system;

means for substituting said second address for said first address in said packet to generate a new packet; and means for sending said new packet to one of said plurality of remote systems or one of said service domains determined by a destination address in said new packet.

13. The SSG of claim 12, wherein said means for storing stores NAT information corresponding to one of said plurality of service domains only in each of said plurality of NAT tables.

14. The SSG of claim 12, wherein at least one of said plurality of NAT tables stores NAT information related to at least two of said plurality of service domains, wherein said at least two of said plurality of service domains have non-overlapping address space accessible by said remote systems.

15. The SSG of claim 12, wherein said first address comprises said local address of said first remote system, and said means for translating maps said local address to said external address of said first remote system, wherein said external address is assigned to said first remote system by said service domain accessed by said first remote system.

16. The SSG of claim 15, wherein said packet is received from said first remote system, said gateway device further comprising:
   means for determining a service domain to which said packet relates to, wherein said service domain is comprised in said plurality of service domains; and
   means for sending said packet to an upstream NAT block which performs said substitution.

17. The SSG of claim 16, wherein said first remote system communicates with said SSG on a point-to-point protocol (PPP) session, said gateway device further comprising:
   means for assigning said local address to said first remote system when said PPP session is set up; and
   means for storing data representing a set of services available for packets received from said first remote system, wherein said means for determining examines a destination address in said packet to identify said service domain to which said packet relates to.

18. A computer readable storage medium carrying one or more sequences of instructions for causing a service selection gateway (SSG) to support network address translation (NAT), said SSG connecting a plurality of remote systems on a network to a plurality of service domains, each of said plurality of remote systems being assigned a corresponding one of a plurality of original addresses, wherein each of a plurality of new addresses is used for a corresponding one of said plurality of remote systems in a corresponding service domain, each of said plurality of original addresses comprising a local address in said network and each of said plurality of new addresses comprising an external address for the remote system in the service domain said method being performed in said SSG, wherein execution of said one or more sequences of instructions by one or more processors contained in said gateway device causes said one or more processors to perform the actions of:
   maintaining a plurality of NAT tables in said SSG, wherein each of said plurality of NAT tables maintains a corresponding plurality of entries representing a mapping information of original addresses to corresponding new addresses, wherein said plurality of entries are partitioned according to service domains such that entries corresponding to each service domain are stored in a single one of said plurality of NAT tables, wherein an entry corresponds to a service domain if the corresponding new address is in the service domain;
   receiving a packet containing a first address;
   translating said first address into a second address using one of said plurality of NAT tables, wherein said first address corresponds to one of said plurality of original addresses or one of said plurality of new addresses of a first remote system, and wherein said second address comprises the other one of said plurality of original addresses or one of said plurality of new addresses of said first remote system;
   substituting said second address for said first address in said packet to generate a new packet; and
   sending said new packet to one of said plurality of remote systems or one of said service domains determined by a destination address in said new packet.

19. The computer readable storage medium of claim 18, wherein each of said plurality of NAT tables stores a NAT information corresponding to one of said plurality of service domains.

20. The computer readable storage medium of claim 18, wherein at least one of said plurality of NAT tables stores NAT information related to at least two of said plurality of service domains, wherein said at least two of said plurality of service domains have non-overlapping address space accessible by said remote systems.

21. The computer readable storage medium of claim 18, wherein said first address comprises said local address of said first remote system, and said translating comprises mapping said local address to said external address of said first remote system, wherein said external address is assigned to said first remote system by said service domain accessed by said first remote system.

22. The computer readable storage medium of claim 21, further comprising:
   determining a service domain to which said packet relates to, wherein said service domain is comprised in said plurality of service domains; and
   sending said packet to an upstream NAT block which performs said substitution.

23. The computer readable storage medium of claim 22, wherein said remote system communicates with said SSG on a point-to-point protocol (PPP) session, further comprising:
   assigning said local address to said first remote system when said PPP session is set up;
   storing in said SSG data representing a set of services available for packets received from said first remote system, wherein said determining comprises examining a destination address in said packet to identify said service domain to which said packet relates to.

24. The computer readable storage medium of claim 23, wherein a separate upstream NAT block is associated with each of said plurality of NAT tables.

25. The computer readable storage medium of claim 24, further comprising maintaining a separate forwarding table associated with the service domains sharing the same NAT table.

26. The computer readable storage medium of claim 18, wherein said packet is received from said service domain and destined to said first remote system, and wherein said first address comprises said external address of said first remote system.

27. The computer readable storage medium of claim 26, further comprising:
   maintaining a global forwarding table; and
   determining a route to send said packet by examining said global forwarding table, wherein said determining is performed after said substitution.

28. The computer readable storage medium of claim 21, wherein said packet is received according to Internet Protocol (IP).

29. A service selection gateway (SSG) supporting network address translation (NAT), said SSG connecting a plurality of remote systems on a network to a plurality of service domains, each of said plurality of remote systems being assigned a corresponding one of a plurality of original addresses, wherein each of a plurality of new addresses is used for a corresponding one of said plurality of remote systems in a corresponding service domain, each of said plurality of original addresses comprising a local address in said network and each of said plurality of new addresses comprising an external address for the remote system in the service domain, said SSG comprising:
- a memory storing a plurality of NAT tables representing information related to network address translation, wherein each of said plurality of NAT tables maintains a corresponding plurality of entries representing a mapping information of original addresses to corresponding new addresses, wherein said plurality of entries are partitioned according to service domains such that entries corresponding to each service domain are stored in a single one of said plurality of NAT tables, wherein an entry corresponds to a service domain if the corresponding new address is in the service domain;
- an inbound interface receiving a packet containing a first address;
- a NAT block translating said first address into a said address using one of said plurality of NAT tables and substituting said second address for said first address in said packet to generate a new packet, wherein said first address corresponds to one of said plurality of original addresses or one of said plurality of new addresses of a first remote system, and wherein said second address comprises the other one of said plurality of original addresses or one of said plurality of new addresses of said first remote system; and
- an outbound interface sending said new packet to one of said plurality of remote systems or one of said service domains determined by a destination address in said new packet.

30. The gateway device of claim 29, wherein each of said plurality of NAT tables stores a NAT information corresponding to one of said plurality of service domains.

31. The SSG of claim 29, wherein at least one of said plurality of NAT tables stores NAT information related to at least two of said plurality of service domains, wherein said at least two of said plurality of service domains have non-overlapping address space accessible by said remote systems.

32. The SSG of claim 29, wherein said original address comprises said local address of said first remote system, and said translating comprises mapping said local address to said external address of said first remote system, wherein said external address is assigned to said first remote system by said service domain accessed by said first remote system.

33. The SSG of claim 32, wherein said packet is received from said first remote system and said first address comprises a source address of said first remote system.

34. The SSG of claim 33, further comprising:
- a service selection table storing data indicating a mapping of each packet to a corresponding one of said plurality of service domain; and
- a service selector determining a service domain to which said packet relates to by examining said service selection table, wherein said service domain is comprised in said plurality of service domains and sending said packet to said NAT block.

35. The SSG of claim 34, wherein a separate upstream NAT block associated with each of said plurality of NAT tables.

36. The SSG of claim 35, further comprising a separate forwarding table associated with the service domains sharing the same NAT table.

37. The SSG of claim 32, wherein said packet is received from said service domain and destined to said first remote system, and wherein said first address comprises said external address of said first remote system.

38. The SSG of claim 37, further comprising:
- a global forwarding table; and
- a forwarding block determining a route to send said packet by examining said global forwarding table, wherein said forwarding block determines said route after said substituting.

39. The SSG of claim 32, wherein said packet is received according to Internet Protocol (IP).

40. The SSG of claim 29, wherein said memory is implemented as a plurality of units.

* * * * *

UNITED STATES PATENT AND TRADEMARK OFFICE
CERTIFICATE OF CORRECTION

PATENT NO. : 7,107,360 B1 Page 1 of 1
APPLICATION NO. : 09/910937
DATED : September 12, 2006
INVENTOR(S) : Phadnis et al.

It is certified that error appears in the above-identified patent and that said Letters Patent is hereby corrected as shown below:

Col. 10, line 48, replace "using" with --by examining--.

Col. 11, line 58, replace "using" with --by examining--.

Col. 12, line 29, replace "said remote system" with --said first remote system--.

Col. 14, line 1, replace "original" with --first--.

Signed and Sealed this

Twenty-eighth Day of November, 2006

JON W. DUDAS
*Director of the United States Patent and Trademark Office*